United States Patent
Rohana et al.

(10) Patent No.: US 8,332,590 B1
(45) Date of Patent: Dec. 11, 2012

(54) MULTI-STAGE COMMAND PROCESSING PIPELINE AND METHOD FOR SHARED CACHE ACCESS

(75) Inventors: Tarek Rohana, Haifa (IL); Gil Stoler, Nofit (IL)

(73) Assignee: Marvell Israel (M.I.S.L.) Ltd., Yokneam (IL)

( * ) Notice: Subject to any disclaimer, the term of this patent is extended or adjusted under 35 U.S.C. 154(b) by 575 days.

(21) Appl. No.: 12/491,025

(22) Filed: Jun. 24, 2009

Related U.S. Application Data (60) Provisional application No. 61/075,590, filed on Jun. 25, 2008, provisional application No. 61/083,310, filed on Jul. 24, 2008, provisional application No. 61/083,319, filed on Jul. 24, 2008, provisional application No. 61/082,379, filed on Jul. 21, 2008.

(51) Int. Cl.
*G06F 12/00* (2006.01)
*G06F 13/00* (2006.01)

(52) U.S. Cl. ........................ 711/140; 711/130; 711/169

(58) Field of Classification Search .................. 711/169, 711/130, 140
See application file for complete search history.

(56) References Cited

U.S. PATENT DOCUMENTS

| | | | | |
|---|---|---|---|---|
| 4,695,943 A | * | 9/1987 | Keeley et al. | 711/140 |
| 5,581,734 A | * | 12/1996 | DiBrino et al. | 711/169 |
| 5,875,468 A | * | 2/1999 | Erlichson et al. | 711/143 |
| 6,363,465 B1 | * | 3/2002 | Toda | 711/169 |
| 6,427,191 B1 | * | 7/2002 | Fu et al. | 711/131 |
| 6,606,686 B1 | | 8/2003 | Agarwala et al. | |
| 6,961,824 B2 | | 11/2005 | Rowlands et al. | |
| 8,117,395 B1 | * | 2/2012 | Rohana et al. | 711/128 |
| 2001/0049771 A1 | | 12/2001 | Tischler et al. | |
| 2005/0091457 A1 | | 4/2005 | Auld et al. | |
| 2005/0206648 A1 | * | 9/2005 | Perry et al. | 345/557 |
| 2009/0083490 A1 | * | 3/2009 | Berger et al. | 711/130 |

* cited by examiner

*Primary Examiner* — Sanjiv Shah
*Assistant Examiner* — Glenn Gossage (57) ABSTRACT

A command processing pipeline is coupled to a shared cache. The command processing pipeline comprises (i) a first command processing stage configured to sequentially receive and process first and second cache commands, and (ii) a second command processing stage coupled to the first command processing stage. The first and the second command processing stages are two consecutive command processing stages of the command processing pipeline. The first and second command processing stages may access different groups of cache resources, and the first and second cache commands may be processed during consecutive clock cycles of a clock signal. Processing of the second cache command may be performed independently of an outcome of processing the first cache command by the first command processing stage. A third command processing stage may write data associated with the first cache command to one of a valid memory and a data memory included in the cache.

20 Claims, 4 Drawing Sheets

Fig. 1

| Command / Pipe Stage | Stage 1 | Stage 2 | Stage 3 | Stage 4 | Stage 5 |
|---|---|---|---|---|---|
| Read Hit | Tag, Valid and Dirty indication Lookup (read) | Tag Result match calculation, Read access to Data and ECC memory | Data and ECC memory sampling for timing reasons | ECC check calculation | ECC correction |
| Write Hit | Tag, Valid and Dirty indication Lookup (read) | Tag Result match calculation, Write access to Data and ECC memory ECC Generation | | | |
| Line Fill Update | Tag, Valid and Dirty memory Write | Write access to Data and ECC memory. ECC Generation | | | |
| Read Miss | Tag, Valid and Dirty indication Lookup (read) | Tag Result miss calculation, Read access to Data and ECC memory | Data and ECC memory sampling for timing reasons; Valid memory Write | ECC check calculation | ECC correction |
| Write Miss | Tag, Valid and Dirty indication Lookup (read) | Tag Result miss calculation. | | | |
| Snoop Clean Hit | Tag, Valid and Dirty indication Lookup (read) | Tag Result match calculation, Read access to Data and ECC memory | Data and ECC memory sampling for timing reasons; Dirty memory write | ECC check calculation | ECC correction |
| Snoop Invalidate Hit | Tag, Valid and Dirty indication Lookup (read) | Tag Result match calculation. | Valid memory write | | |
| Snoop Clean & Invalidate Hit | Tag, Valid and Dirty indication Lookup (read) | Tag Result match calculation, Read access to Data and ECC memory | Data and ECC memory sampling for timing reasons; Valid / Dirty memory Write | ECC check calculation | ECC correction |
| Snoop Miss | Tag, Valid and Dirty indication Lookup (read) | Tag Result miss calculation. | | | |

MULTI-STAGE COMMAND PROCESSING PIPELINE AND METHOD FOR SHARED CACHE ACCESS

CROSS REFERENCE TO RELATED APPLICATIONS

The present application claims priority to U.S. Patent Application No. 61/075,590 filed Jun. 25, 2008, entitled "SMP Shared L2 Cache Optimized Pipeline," to U.S. Patent Application No. 61/083,310 filed Jul. 24, 2008, entitled "SMP Shared L2 Cache—Method for Read After Read Pipeline Optimization," to U.S. Patent Application No. 61/083,319 filed Jul. 24, 2008, entitled "SMP Shared L2 Cache: Method for Write After Read Pipeline Optimization," and to U.S. Patent Application No. 61/082,379 filed Jul. 21, 2008, entitled "SMP Shared L2 Cache—Method for Data RAM Way Access Improvement," the entire specifications of which are hereby incorporated by reference in their entirety for all purposes, except for those sections, if any, that are inconsistent with this specification. U.S. patent application Ser. No. 12/506,805 filed Jul. 21, 2009, entitled "Multi-Stage Pipeline for Cache Access" claims priority to the current application.

TECHNICAL FIELD

Embodiments of the present invention relate to caches, and more particularly, to multi-stage pipelines for cache access.

BACKGROUND

A cache is a memory bank that bridges main memory and a processing core, and is used to speed up data transfers and instruction execution. The cache is usually faster than main memory and allows instructions to be executed and data to be read and written at relatively higher speed. A suitable type of random access memory (RAM) (e.g., a static RAM or SRAM) may be used as a cache.

A second level cache may be shared among two or more processing cores and may include different classes of storage areas (referred to henceforth as cache resources) for storing different types of information that is related to data or instructions, e.g., tag memory, dirty memory, valid memory, data memory, error correcting code (ECC) memory, etc. A cache is usually also associated with one or more other elements (also referred to henceforth as cache resources) that are used, for example, for generating, checking, and/or correcting error correcting codes associated with data stored in the cache, e.g., ECC check module, ECC correcting module, ECC generation module, etc. A cache may handle many different types of cache commands (e.g., read access command, write access commands, snoop commands, etc.), which access the cache to read data from and/or write data to the cache.

Processing a cache command may require access to one or more of the cache resources. However, in a shared cache environment access to the one or more cache resources may be limited to a single processing core until a cache command has been resolved. For example, if a tag memory of a cache is being accessed by a first processing core for processing a first cache command, the tag memory may not be accessed by a different processing core (or by the same processing core) for processing a different cache command until resolution of the first cache command (or at least a part of the first cache command). This may be a limiting factor in achieving higher speed of a cache, particularly when the cache is shared by two or more processing cores.

SUMMARY

In an embodiment, the present disclosure is directed to an apparatus and a method for operating a multi-staged command processing pipeline for shared access to a second level cache. More specifically, there is provided, in accordance with an embodiment of the present disclosure, a command processing pipeline to be coupled to a shared cache, the command processing pipeline comprising a first command processing stage configured to sequentially receive a first cache command and a second cache command, and to sequentially process the received first cache command and second cache command, wherein the first command processing stage may be configured to process the second cache command independently of an outcome of processing the first cache command by the first command processing stage; and a second command processing stage coupled to the first command processing stage such that the first command processing stage and the second command processing stage are two consecutive command processing stages of a plurality of command processing stages of the command processing pipeline, the second command processing stage configured to sequentially receive the first cache command and the second cache command after processing by the first command processing stage, and to process the received first cache command substantially simultaneously with the second cache command being processed by the first command processing stage.

In an embodiment, the first command processing stage may be configured to process the second cache command before full resolution of the first cache command by the command processing pipeline. The first command processing stage may also be configured to determine whether the first cache command is a hit or a miss, wherein the command processing pipeline may be configured to process the second cache command by the first command processing stage independently of determining whether the first cache command is a hit or a miss. The first cache command and the second cache command may be received by the first command processing stage during two consecutive clock cycles. The first command processing stage may be further configured to access a first group of cache resources while processing the first and second cache commands, the second command processing stage may be further configured to access a second group of cache resources while processing the first and second cache commands, and the first group of cache resources and the second group of cache resources may be different cache resources. The first command processing stage may be further configured to access a first group of cache resources while processing the first and second cache commands, the first group of cache resources comprising one or more of a tag memory, a dirty memory, and a valid memory, and the second command processing stage may be further configured to access a second group of cache resources while processing the first and second cache commands, the second group of cache resources comprising one or more of a data memory and an error correcting code (ECC) memory. The first command processing stage may be configured to perform an address lookup of the first cache command, by comparing an address associated with the first cache command with information stored in one or more of a tag memory, a dirty memory, and a valid memory included in the cache, and determine whether the first cache command is a hit or a miss based at least in part on the address lookup.

In an embodiment, the second command processing stage may be configured to process the first cache command, based at least in part on the determination of whether the first cache command is a hit or a miss and on a determination of a type of the first cache command, by being configured to provide read access and/or write access to a data memory and/or an error correcting code (ECC) memory included in the cache, and/or being configured to generate an error correcting code associated with data to be written to the data memory. The command processing pipeline may further comprise a third command processing stage coupled to the second command processing stage, and configured to sequentially receive the first cache command and the second cache command after processing by the second command processing stage, and to process the received first cache command substantially simultaneously with the second cache command being processed by the second command processing stage, wherein processing of the first cache command by the third command processing stage may include writing to a valid memory and/or a dirty memory included in the cache. The command processing pipeline may further comprise a fourth command processing stage coupled to the third command processing stage, and configured to receive the first cache command after processing by the third command processing stage, and to process the received first cache command by performing an error correcting code (ECC) check of data read from a data memory and/or an ECC memory of the cache, wherein the data may be read from the data memory and/or the ECC memory while the first cache command is being processed by the second command processing stage. The command processing pipeline may further comprise a fifth command processing stage coupled to the fourth command processing stage, and configured to receive the first cache command after processing by the fourth command processing stage, and to process the received first cache command by being configured to perform an ECC correction of the read data in case an ECC error is determined while the first cache command is being processed by the fourth command processing stage.

In an embodiment, the command processing pipeline may further comprise a third command processing stage, a fourth command processing stage, and a fifth command processing stage, wherein the third, fourth and fifth command processing stages may be configured to sequentially process the first and second cache commands, wherein the first, second, third, fourth and fifth command processing stages may be five consecutive command processing stages of the command processing pipeline, and wherein each of the five consecutive command processing stages may access only those cache resources that are not being accessed by an adjacent command processing stage. The first and second cache commands may be received from one or more of a plurality of processors and/or processes that have shared access to the cache. The first and second cache commands may be two of a read command, a write command, a line fill command, a snoop clean command, a snoop invalidate command, and/or a snoop clean and invalidate command.

There is also provided, in accordance with an embodiment of the present invention, a method for accessing a shared cache using a command processing pipeline having a plurality of command processing stages, the method comprising processing, by a first command processing stage, a first cache command and a second cache command by accessing a first group of cache resources, receiving, by a second command processing stage, the first cache command processed by the first command processing stage, and processing, by the second command processing stage, the received first cache command substantially simultaneously with the processing of the second cache command by the first command processing stage, wherein processing the received first cache command by the second command processing stage comprises accessing a second group of cache resources, wherein the first group of cache resources includes cache resources that are different than cache resources included in the second group of cache resources.

In an embodiment, processing of the second cache command by the first command processing stage may be performed independently of an outcome of processing the first cache command by the first command processing stage. Processing the first command by the first command processing stage may be performed during a first clock cycle, the processing of the second cache command may be performed by the first command processing stage during a second clock cycle, and the first clock cycle and the second clock cycle may be two consecutive clock cycles of a clock signal. Processing the first cache command by the first command processing stage may further comprise performing an address lookup of the first cache command by comparing an address associated with the first cache command with information stored in one or more of a tag memory, a dirty memory, and a valid memory included in the cache, and determining whether the first cache command is a hit or a miss based at least in part on the address lookup. Processing the first cache command by the second command processing stage may further comprise processing the first cache command by providing read access and/or write access to a data memory and/or an error correcting code (ECC) memory included in the cache, and/or generating an error correcting code associated with data to be written to the data memory, wherein such providing and/or generating may be based at least in part on a type of the first cache command and whether the first cache command is a hit or a miss. The method may further comprise processing, by a third command processing stage, the first cache command after the first cache command has been processed by the second command processing stage, wherein processing by the third command processing stage comprises writing data associated with the third command to a valid memory and/or a dirty memory included in the cache, processing, by a fourth command processing stage, the first cache command after the first cache command has been processed by the third command processing stage, wherein processing by the fourth command processing stage comprises performing an error correcting code (ECC) check of data read from a data memory and/or an ECC memory of the cache, wherein the data is read from the data memory and/or the ECC memory while the first cache command is being processed by the second command processing stage, and processing, by a fifth command processing stage, the first cache command after the first cache command has been processed by the fourth command processing stage, wherein processing by the fifth command processing stage comprises performing an ECC correction of the read data in case an ECC error is determined while the first cache command is being processed by the fourth command processing stage.

There is also provided, in accordance with an embodiment of the present invention, a method for processing a plurality of cache commands by a multistage command processing pipeline coupled to a shared cache, the multistage command processing pipeline including a plurality of command processing stages, the method comprising processing, by a first command processing stage, a first cache command during a first clock cycle, the processing including performing an address lookup of the first cache command to determine whether the first cache command is a hit or a miss; processing, by a second command processing stage, the first cache command during a second clock cycle based at least in part on determining whether the first cache command is a hit or a miss, wherein the first and second clock cycles are two consecutive clock cycles of a clock signal; and processing, by the first command processing stage, a second cache command during the second clock cycle, the processing of the second cache command by the first command processing stage being independent of determining whether the first cache command is a hit or a miss.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

As previously noted, a cache may be shared among two or more processing cores and may include one or more resources for storing different types of information that is related to data or instructions, e.g., tag memory, dirty memory, valid memory, data memory, ECC memory, etc. The tag memory (sometimes referred to as tag random access memory, tag RAM, in case the cache is a RAM) is a part of the cache that may store addresses of data currently stored in each cache line. The values stored in the tag memory may determine whether a cache lookup results in a hit or a miss. The actual data may be stored in data memory (also referred as data RAM, in case the cache is a RAM), which may also be a part of the cache. The dirty memory (also referred to as dirty RAM, in case the cache is a RAM) may be used to identify the data in the cache that has been recently modified, and/or is not currently in synchronization with the main memory. The valid memory (also referred to as valid RAM, in case the cache is a RAM) may be used to identify the data in the cache that is currently valid. An ECC memory may be used to store error correcting codes associated with data stored in the cache.

A cache may also be associated with one or more other resources (e.g., ECC check module, ECC correcting module, ECC generation module, etc.), which, for example, may be a part of the cache and/or a control circuit (e.g., a cache controller) configured to control the cache. An ECC check module may be a part of a cache controller that may be configured, for example, to perform an ECC check on data associated with the cache. An ECC correcting module may be a part of a cache controller that may be configured, for example, to correct any error in the data (e.g., data that is to be written to or read from the cache) based on checking an error correcting code. An ECC generation module may be configured, for example, to generate error correcting codes while writing data in the cache.

Figure 1:
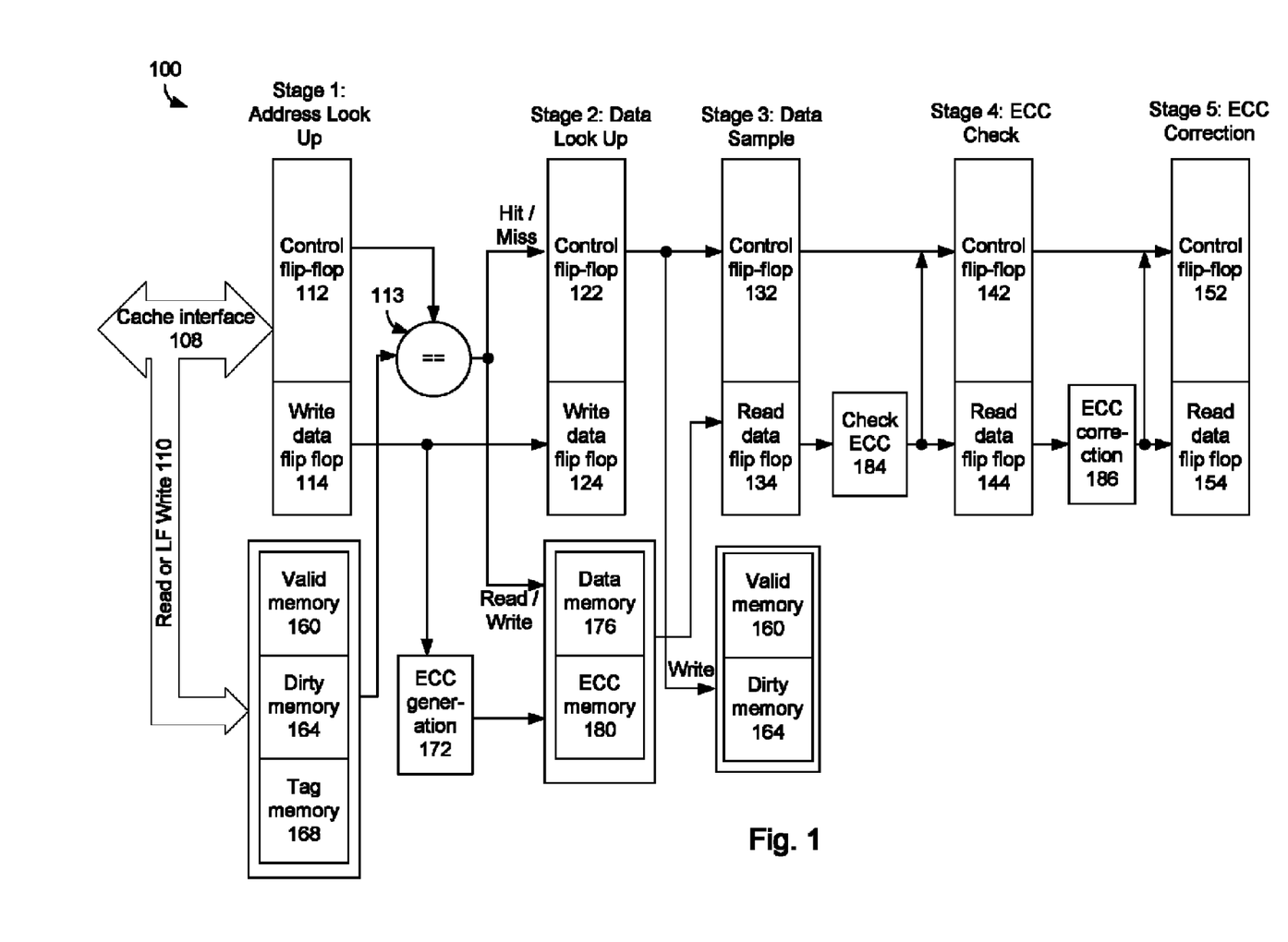
FIG. 1 schematically illustrates an example command processing pipeline 100 that is configured to be coupled to a cache, in accordance with an embodiment of the present invention.

FIG. 1 schematically illustrates an example command processing pipeline 100 that is configured to be coupled to a cache, in accordance with an embodiment of the present invention. Although the cache is not illustrated as a separate entity in FIG. 1, one or more resources associated with the cache are illustrated in the figure, as discussed in more detail below. In an embodiment, the cache may be a second level cache, e.g., a Level 2 (L2) cache. In an embodiment, the cache may be a shared cache, that is to say, one or more processing cores may have shared access to the cache. In an embodiment, one or more processors may have shared access to the cache through the command processing pipeline 100 (henceforth also referred to as "pipeline 100").

In an embodiment, the pipeline 100 may be used to process one or more cache commands received from one or more processors and/or other elements (e.g., memory controller and/or one or more processes) that may have access to the cache. For example, the pipeline 100 may process one or more cache commands, such as a read command, a write command, a line fill command, a snoop clean command, a snoop invalidate command, a snoop clean and invalidate command, and/or the like.

In an embodiment, the pipeline 100 may have a plurality of command processing stages (henceforth also referred to as "stages"), each stage associated with one or more resources of the cache. The individual command processing stages may access the associated one or more cache resources while processing a cache command (henceforth also referred to as a "command"). In an embodiment, no two consecutive stages may be associated with or have access to the same cache resource. For example, the first command processing stage may be associated with valid memory 160, dirty memory 164, and/or tag memory 168, whereas the second command processing stage may be associated with data memory 176, ECC memory 180, and/or an ECC generation module 172. Thus, the first and second command processing stages may have access to mutually exclusive groups of cache resources. The third command processing stage may be associated with valid memory 160 and/or dirty memory 164. Thus, the second and third command processing stages may be associated with and have access to mutually exclusive groups of cache resources.

The pipeline 100 may receive one or more cache commands over the cache interface 108. In an embodiment, each cache command may be sequentially processed by one or more of the command processing stages of the pipeline 100, and individual command processing stages may take one clock cycle each to process a cache command. Different commands may be processed by a different number of stages. For example, a read hit command may be sequentially processed by all five of the command processing stages, while a line fill update command may be sequentially processed by, for example, the first two of the five command processing stages, as discussed in more detail below. Thus, the read hit command may be processed in five clock cycles, whereas the line fill update command may be processed in two clock cycles. In an embodiment, the processing of individual cache commands may be at least partially independent of the processing of other cache commands, as discussed in more detail below.

When a cache command is received by the pipeline 100, the cache command may have an associated address (e.g., address of a main memory that includes data cached by the cache). Upon receiving the cache command, the pipeline 100 may compare the associated address to determine if data associated with the address is currently cached or stored in the cache, and if the data is valid data or dirty data. This may be done by performing an address lookup, e.g., by comparing the cache command address with information stored in the tag memory 168, valid memory 160 and/or dirty memory 164. For example, in an embodiment the tag memory 168, valid memory 160 and/or dirty memory 164 may receive a read command, a write command and/or a line fill (LF) write command (illustrated as read or LF write 110 in FIG. 1) over the cache interface 108, and compare the cache command address in the receive cache command with information stored in the tag memory 168, valid memory 160 and/or dirty memory 164. Accordingly, in an embodiment, the first stage of the pipeline 100 may be an address lookup stage, which may have access to valid memory 160, dirty memory 164, and/or tag memory 168. The first stage may include a control flip-flop 112 and a write data flip flop 114, and may be configured to receive one or more cache commands and perform address lookup by comparing (the comparison operation is illustrated by block 113 in FIG. 1) addresses associated with the cache commands with information stored in the valid memory 160, dirty memory 164, and/or tag memory 168. The result of the comparison may indicate whether individual cache commands are hit or miss, and further processing of individual commands may be based on the comparison results.

In an embodiment, the second stage may be a data lookup stage, which may have read access and/or write access to various resources of the cache, e.g., data memory 176, ECC memory 180, and/or ECC generation module 172. The second stage may include a control flip flop 122 and a write data flip flop 124. The second stage may be configured to receive the cache commands processed by the first stage, and to process the received cache commands. In an embodiment, the second stage may generate an ECC code (e.g., using the ECC generation module 172, which may generate error correcting codes for data to be written to the cache in case the cache command is a write command). The second stage may also be configured to provide a cache command an access to read from and/or write to the data memory 176 and/or ECC memory 180, based at least in part of the type of cache command being processed by the second stage.

In an embodiment, the third stage may be a data sampling stage, which may have access to, for example, valid memory 160 and dirty memory 164. The third stage may be configured, for example, to sample data read from the cache (e.g., data read from data memory 176 and ECC memory 180 during the second stage), and/or to write data in the valid memory 160 and/or dirty memory 164. The third stage may include a control flip flop 132 and a read data flip flop 134.

In an embodiment, the fourth and fifth stages may be ECC check stage and ECC correction stage, respectively. The fourth stage may have access to a check ECC module 184, and may include a control flip flop 142 and a read data flip flop 144. The fourth stage may be configured to check an error correcting code using, for example, the check ECC module 184. In case of an ECC error, the fifth or ECC correction stage may correct the ECC error using an ECC correction module 186, and may include a control flip flop 152 and a read data flip flop 154. Thus, the fifth stage may have access to the ECC correction module 186.

Figure 2:
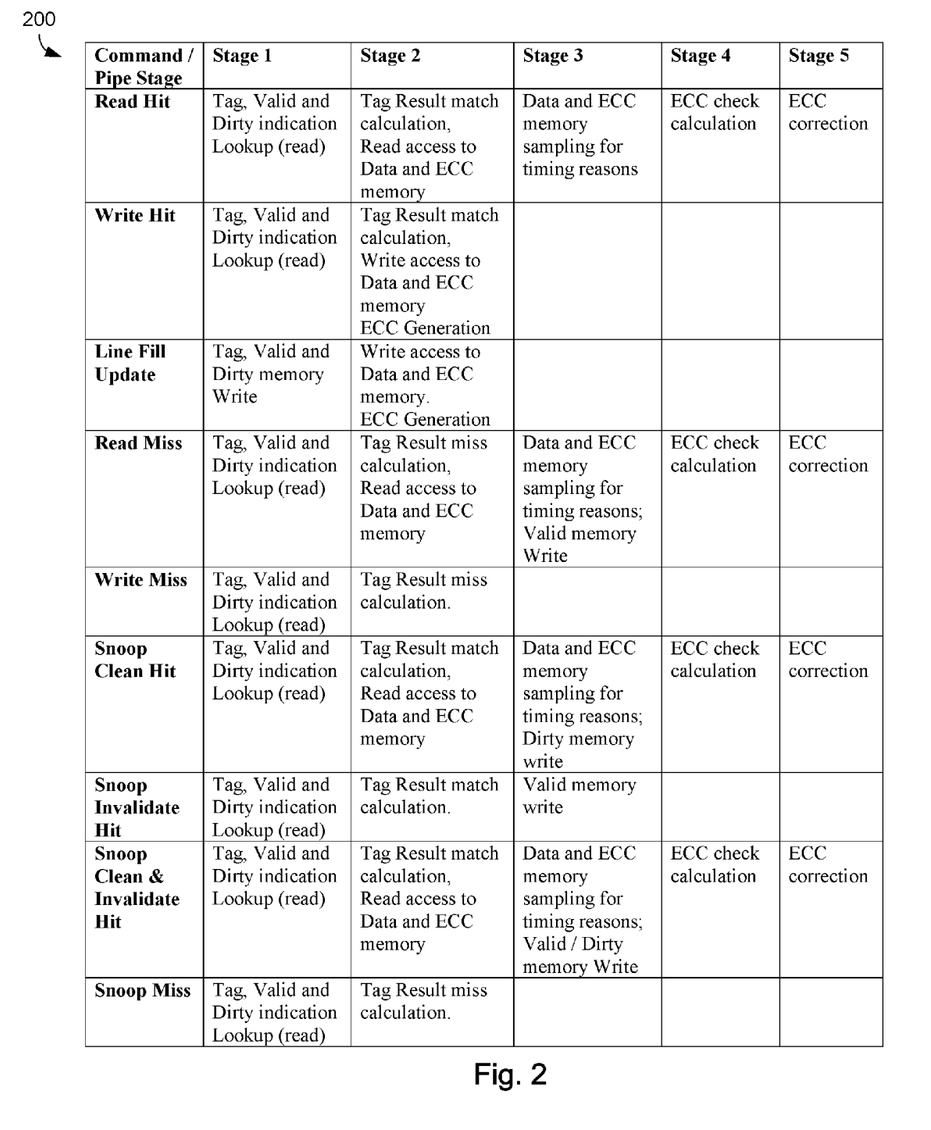
FIG. 2 includes a table 200 that illustrates processing sequences for various example cache commands by the command processing stages of the command processing pipeline 100 of FIG. 1, in accordance with an embodiment of the present invention.

FIG. 2 includes a table 200 that illustrates processing sequences for various example cache commands by the command processing stages of the command processing pipeline 100 of FIG. 1, in accordance with an embodiment of the present invention. Individual rows of table 200 illustrate how respective commands are processed by one or more of the five command processing stages of the pipeline 100.

Once a read command is received by the first stage over the cache interface 108, the address associated with the read command may be looked up in the tag memory 168, valid memory 160 and/or dirty memory 164 to determine if the command is a hit or miss. The first row of table 100 is associated with the situation where the read command is a hit (e.g., a read hit command), whereas the fourth row of the table 100 is associated with the situation where the read command is a miss (e.g., a read miss command). Referring to the first row of table 200, the second stage performs the tag result match calculation, and upon deciding that the read command is a hit, provides read access to data memory 176 and/or ECC memory 180. In an embodiment, once read access has been provided in stage 2, ECC check and ECC correcting (if necessary or desired) may be directly performed by the fourth and fifth stage, respectively. However, for timing reasons (e.g., to ensure that the read hit command does not bypass the third stage), in another embodiment, the read data from the data memory 176 and/or ECC memory 180 may be sampled by the third stage. The fourth stage may perform an ECC check using the check ECC module 184, and if desired, ECC correction may be performed by the fifth module using the ECC correction module 186.

Processing of several other cache commands are also illustrated in table 200. For example, the second row illustrates how the pipeline 100 may process a write command if the write command is a hit (e.g., if the address associated with the write command is located in the tag memory 168 and if the associated data in the cache is valid, as indicated by the valid memory 160). The processing of various cache commands, as illustrated in table 200, may be readily understood by those skilled in the art based on the teachings provided herein, and hence, detailed discussion of some of the cache commands in table 200 has been omitted for the sake of brevity.

As previously noted, in an embodiment, the pipeline may be configured such that none of any two consecutive stages in the pipeline access the same cache resources. For example, referring again to FIG. 1, the first stage may access the tag memory 168, valid memory 160 and/or dirty memory 164 while processing a cache command, whereas the second stage may access the data memory 176 and the ECC memory 180 while processing another cache command. That is, the first and second stages may not access the same resources, but rather the first and second stages access different (e.g., mutually exclusive) cache resources. Accordingly, there may not be any conflict in simultaneously accessing respective resources by the first and second stages, while processing two different cache commands by the two stages. Thus, while the second stage is processing a first cache command (and possibly accessing the data memory 176 and the ECC memory 180 for such processing), the first stage may simultaneously intake a new (e.g., a second) cache command and process the second cache command by accessing the tag memory 168, valid memory 160 and/or dirty memory 164. That is, the pipeline 100 may be configured to sequentially (e.g., in two consecutive clock cycles) receive the first and second cache commands, and the second stage may be configured to process the first cache command (after the first cache command has been processed by the first stage) substantially simultaneously (e.g., during a same clock cycle) with the second cache command being processed by the first stage.

Similarly, as the second and third stage access different cache resources, the third stage may receive and process the first cache command substantially simultaneously (e.g., during the same clock cycle) with the second command being processed by the second stage.

Thus, the pipeline 100 may receive and start processing a second cache command in a given clock cycle, even if the pipeline 100 received and started processing a first cache command during an immediately previous clock cycle, irrespective of the result of the address lookup of the first command performed by the first stage (e.g., irrespective of whether the first command is a hit or a miss).

In comparison, when two (e.g., a first and a second) cache commands are to be processed sequentially in a conventional cache, the second command has to wait to be processed until the first command is processed. For example, in a conventional cache, an address lookup is performed for the first command to determine a hit or a miss, and based on the address lookup, subsequent processing of the first command is performed. The start of processing of the second command, in a conventional cache, may start only after completion of the first command. At the least, the start of processing of the second command, in a conventional cache, may depend on the address lookup and comparison results of the first command, to avoid any conflict in accessing one or more resources while simultaneously processing both the first and second commands. However, as previously discussed, since any two consecutive stages of the pipeline 100 access different cache resources, a second command may enter the pipeline immediately after (e.g., in the next clock cycle) the first command has entered the pipeline 100, irrespective of the address lookup or compare results (e.g., the result of the address look up to determine a hit or a miss) of the first command. In an embodiment, such sequential and seamless processing of the cache commands may significantly speed up the access speed of the cache.

In an embodiment, some of the cache commands may be broken down to make those commands compatible with the pipeline 100. For example, a line fill update command (third row of table 200) may be issued when a cache miss indication is asserted, and may be used to write data in a pre-allocated entry in the cache, as is well known to those skilled in the art. A line fill update command may not usually require an address lookup or comparison with a tag memory, a valid memory or a dirty memory, and the command may be executed by directly having write access in the data and ECC memories in a single stage or a single clock cycle. However, such direct access (e.g., by bypassing the first stage of the pipeline 100) may create resource conflict with other cache commands. For example, the line fill update command may try to access the data memory simultaneously with a previous cache command (that entered the pipeline in the immediately previous cycle) also accessing the data memory at the same time. To avoid such conflict and to make the line fill update command compatible with the pipeline 100, in an embodiment, processing of the line fill update command may be broken down in two stages (see table 200): the first stage may perform an address lookup of the line fill update command (even though such lookup may not be necessary for the command), and the second stage may provide write access to the data memory 176 and/or ECC memory 180. Breaking down the line fill update command in two stages many increase the number of clock cycles (e.g., one clock cycle) used to complete the command, but such breaking down may ensure that the command is not a blocking command (i.e., does not block entry of new commands in the pipeline while the current command is being processed by one of the stages), thereby ensuring smooth operation of the pipeline 100. Additionally, as the line fill update is a relatively time insensitive command (e.g., compared to a read hit command), an increase of one clock cycle processing time may not have any significant adverse effect.

Similarly, a read miss command (see row four of table 200) may have read access to data memory 176 and/or ECC memory 180, and have write access to valid memory during a single clock cycle. However, to make a read miss command compatible with the pipeline 100 (and to ensure that no consecutive stages of the pipeline 100 have access to the same resource), the write access to the valid memory 160 may be given to the read miss command in the third stage (instead of the second stage), as illustrated in the fourth row of table 200. Although this may increase the processing time of the read miss command by one clock cycle, such an increase may not be significant given that a read miss command is a relatively time insensitive command (e.g., compared to a read hit command), and such an increase may be necessary for smooth operation of the pipeline 100.

The third stage of the pipeline 100 may have write access to the valid memory 160 and/or dirty memory 164 for processing some of the cache commands, e.g., read miss command, some of the snoop commands, etc., as illustrated in the third column of table 200. While the third stage accesses the valid memory 160 and/or dirty memory 164 for processing one or more of these commands, no new command may be allowed to enter the pipeline 100. This is because, if any new command enters the pipeline, the first stage of the pipeline may try to access the valid memory 160 and/or dirty memory 164 to process the new command while the third stage may also be simultaneously accessing one or more of these cache resources, thereby creating access conflict for these cache resources. Thus, these commands may be blocking the pipeline (e.g., preventing new commands from entering the pipeline) while being processed by the third stage. However, the number of blocking commands is relatively small, and these commands block entry of new commands when processed by only one of the five stages. Accordingly, the degradation of access speed because of such blocking may not be significant compared to improvement of speed achieved using the pipeline 100, as previously discussed. Also, in a relatively large sized cache, the probability of a hit is relatively large and high rate cache commands (e.g., those commands that usually occur relatively more frequently, like read hit, write hit, etc.) may pass through the pipeline 100 without blocking entry of any new cache command in the pipeline 100.

Figure 3:
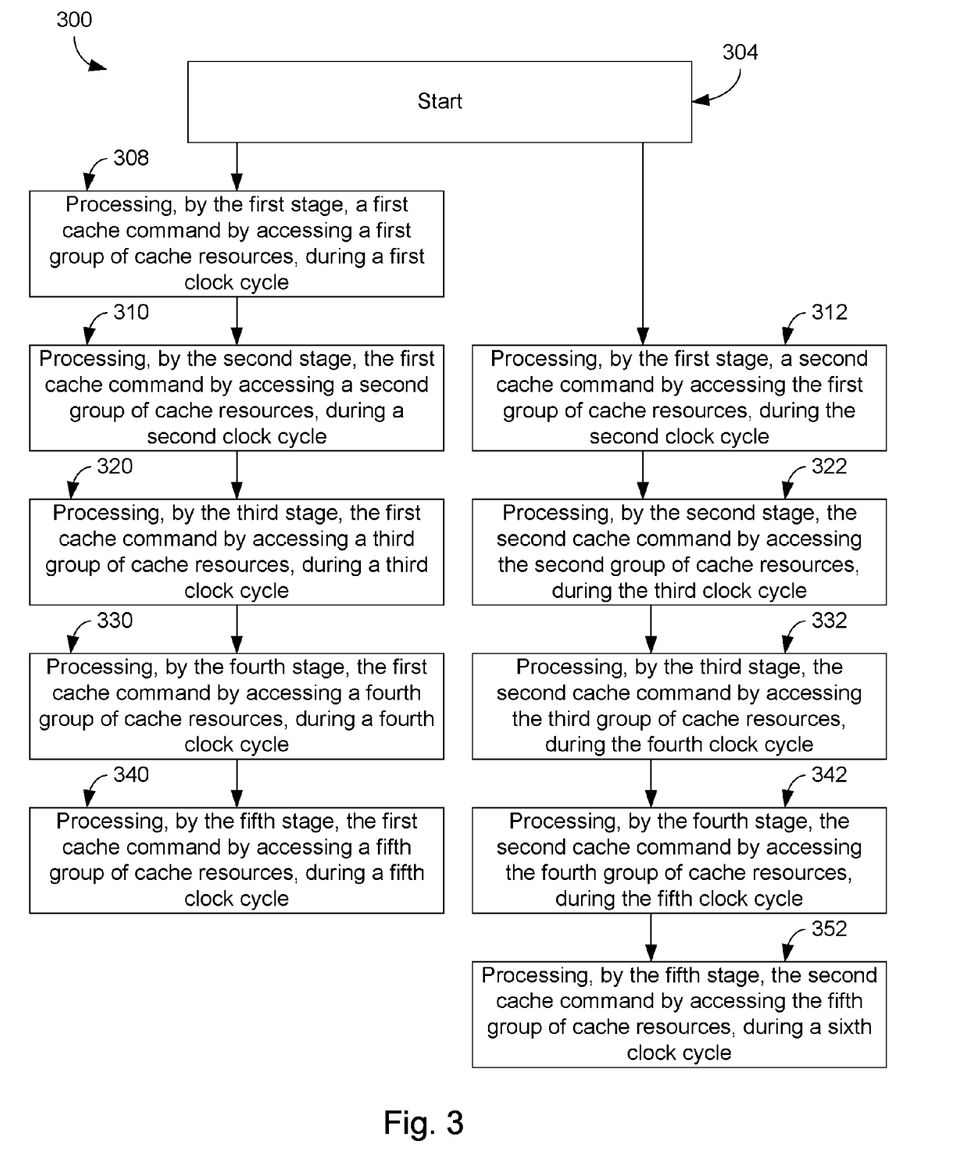
FIG. 3 illustrates an example method 300 of operating the command processing pipeline 100 of FIG. 1, in accordance with an embodiment of the present invention.

FIG. 3 illustrates an example method 300 of operating the command processing pipeline 100 of FIG. 1, in accordance with an embodiment of the present invention. The method starts at block 304. At block 308, the method 300 includes processing, by the first stage, a first cache command by accessing a first group of cache resources, during a first clock cycle. As previously discussed, the first group of cache resources may include valid memory 160, dirty memory 164 and/or tag memory 168.

In an embodiment, the method 300 may further include, at block 310, processing, by the second stage, the first cache command (that has already been processed by the first stage at block 308) by accessing a second group of cache resources, during a second clock cycle. As previously discussed, the second group of cache resources may include data memory 176, ECC memory 180 and/or ECC generation module 172. Thus, the resources included in the second group of cache resources may be different from the resources included in the first group of cache resources.

The method 300 may further include, at block 312, processing, by the first stage, a second cache command by accessing the first group of cache resources, during the second clock cycle. Thus, the operations in blocks 310 and 312 may be performed substantially simultaneously, e.g., during the same (e.g., second) clock cycle.

The method 300 may further include, at block 320, processing, by the third stage, the first cache command (that has already been processed by the second stage at block 310) by accessing a third group of cache resources, during a third clock cycle. As previously discussed, the third group of cache resources may include valid memory 160 and/or dirty memory 164. Thus, the resources included in the second group of cache resources may be different from the resources included in the third group of cache resources.

The method 300 may further include, at block 322, processing, by the second stage, the second cache command (that has already been processed by the first stage at block 312) by accessing the second group of cache resources, during the third clock cycle. Thus, the operations in blocks 320 and 322 may be performed substantially simultaneously, e.g., during the same (e.g., third) clock cycle.

The method 300 may further include, at block 330, processing, by the fourth stage, the first cache command (that has already been processed by the third stage at block 320) by accessing a fourth group of cache resources, during a fourth clock cycle. As previously discussed, the fourth group of cache resources may include ECC check module 184. Thus, the resources included in the third group of cache resources may be different from the resources included in the fourth group of cache resources.

The method 300 may further include, at block 332, processing, by the third stage, the second cache command (that has already been processed by the second stage at block 322) by accessing the third group of cache resources, during the fourth clock cycle. Thus, the operations in blocks 330 and 332 may be performed substantially simultaneously, e.g., during the same (e.g., fourth) clock cycle.

The method 300 may further include, at block 340, processing, by the fifth stage, the first cache command (that has already been processed by the fourth stage at block 330) by accessing a fifth group of cache resources, during a fifth clock cycle. As previously discussed, the fifth group of cache resources may include ECC correcting module 186. Thus, the resources included in the fourth group of cache resources may be different from the resources included in the fifth group of cache resources.

The method 300 may further include, at block 342, processing, by the fourth stage, the second cache command (that has already been processed by the third stage at block 332) by accessing the fourth group of cache resources, during the fifth clock cycle. Thus, the operations in blocks 340 and 342 may be performed substantially simultaneously, e.g., during the same (e.g., fifth) clock cycle.

The method 300 may further include, at block 352, processing, by the fifth stage, the second cache command (that has already been processed by the fourth stage at block 342) by accessing the fifth group of cache resources, during a sixth clock cycle.

In an embodiment, the first, second, third, fourth, fifth and sixth clock cycles may be consecutive clock cycles of a clock signal.

FIG. 3 illustrates processing of both the first and second cache commands by all the five stages of the pipeline 100. However, not all cache commands may be required to be processed by all the five stages. For example, a write miss command may be processed by only the first two stages of the pipeline 100, as illustrated in table 100. Similarly, a snoop invalidate hit command may be processed by only the first three stages of the pipeline 100. Accordingly, based at least in part on the type of the cache command, the method 300 of FIG. 3 may be truncated earlier than block 340 and/or block 352.

As illustrated in FIG. 3, the first stage is configured to process the second cache command before full resolution of the first cache command by the pipeline 100. For example, the first stage is configured to process the second cache command before completion of processing of the first cache command by various stages of the pipeline 100.

It is noted that processing may proceed in a pipelined manner such that processing on a third cache command (not shown) may also proceed once the second cache command advances through pipeline 100, for example reaches stage 2, and/or before the processing of the second cache command is fully completed.

Figure 4:
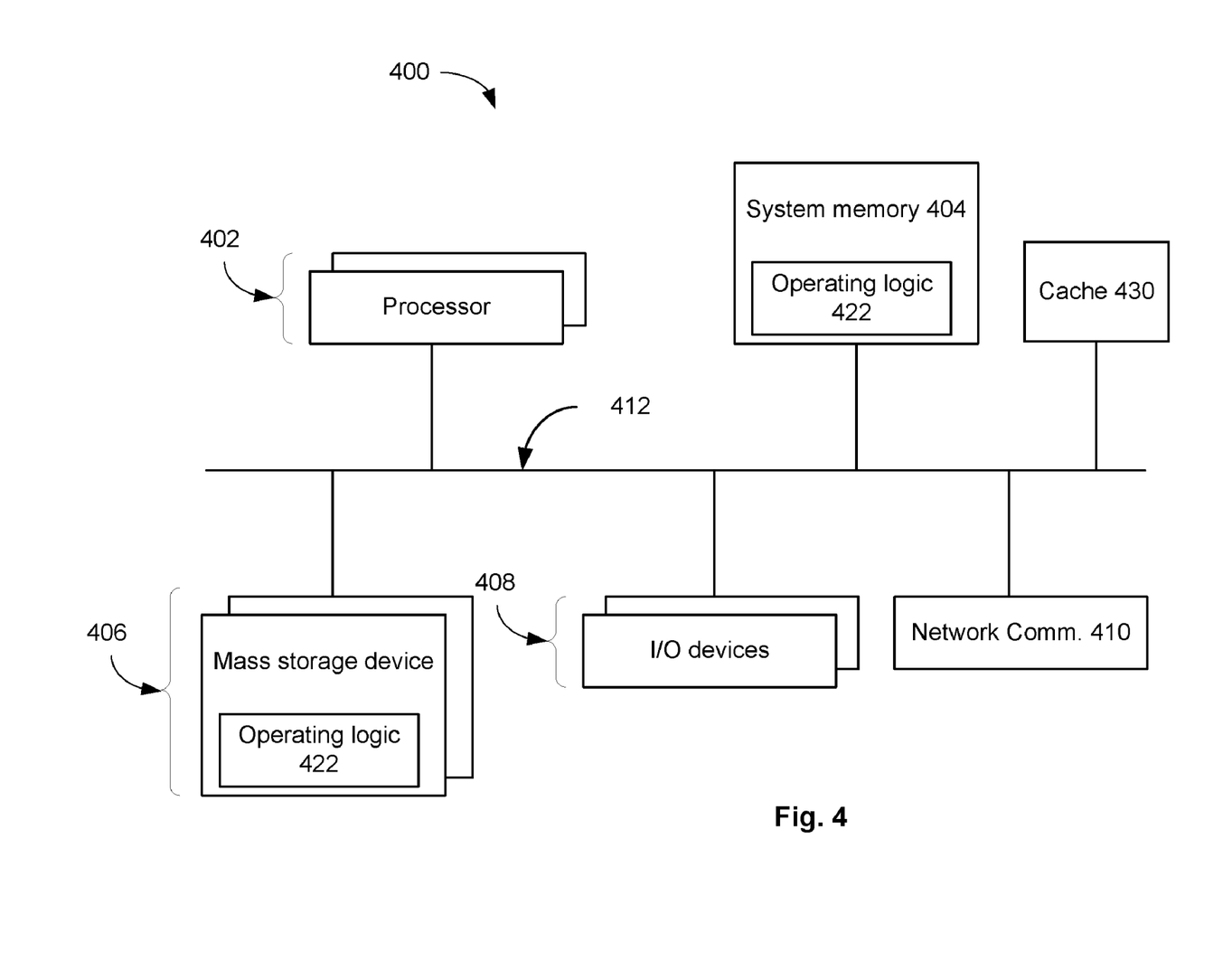
FIG. 4 is a simplified block diagram of a system in which embodiments of the present invention may be implemented.

FIG. 4 is a simplified block diagram of a system in which embodiments of the present invention may be implemented. As illustrated, system 400 includes one or more processors or processor cores 402, and system memory 404. For the purpose of this application, including the claims, the terms "processor" and "processor cores" may be considered synonymous, unless the context clearly requires otherwise. Additionally, system 400 includes mass storage devices 406 (such as diskette, hard drive, compact disc read only memory (CDROM) and so forth), input/output devices 408 (such as a display to render visual manifestation, a keyboard, a cursor control, and so forth) and network communication interfaces 410 (such as network interface cards, modems and so forth). The elements of FIG. 4 may be coupled to each other via system bus 412, which represents one or more buses. In the case of multiple buses, they may be bridged by one or more bus bridges (not illustrated).

Each of these elements performs typical functions. For example, system memory 404 and mass storage 406 may be employed to store a working copy and a permanent copy of the programming instructions implementing all or a portion of earlier described functions, herein collectively denoted as operating logic or instructions 422. The instructions 422 may be assembler instructions supported by processor(s) 402 or instructions that can be compiled from high level languages, such as C.

The permanent copy of the programming instructions may be placed into mass storage 406 in the factory, or in the field, through, for example, a distribution medium (not shown), such as a compact disc (CD), or through network communication interface 410 (from a distribution server (not shown)). That is, one or more distribution media having operating logic or instructions 422 may be employed to distribute the operating logic or instructions 422 and program various computing devices. In an embodiment, the mass storage 406 may be, for example, a permanent storage medium.

In an embodiment, the system 400 may include a cache 430. The cache 430 may be, for example, a level 2 (L2) cache and/or may provide shared access to one or more of the processors 402. Although not illustrated in FIG. 4, in an embodiment, the access to the cache 430 may be through a command processing pipeline, e.g., the pipeline 100 of FIG. 1. Although not illustrated, one or more operations of the cache 430 and/or the associated pipeline may be controlled by a suitable cache controller. In an embodiment, the cache 430 may be used to store or cache data from the system memory 404. In an embodiment, the system memory 404, operating logic or instructions 422 and/or the mass storage 406 may include instructions necessary to operate the cache 430, the cache controller, and/or the associated command processing pipeline.

In embodiments of the present invention, an article of manufacture (not illustrated) may be employed to implement one or more methods as disclosed herein. For example, in example embodiments, an article of manufacture may comprise a storage medium and a plurality of programming instructions stored in the storage medium and adapted to program a computing device to configure the computing device to operate a command processing pipeline coupled to the cache 430.

Although specific embodiments have been illustrated and described herein, it will be appreciated by those of ordinary skill in the art and others, that a wide variety of alternate and/or equivalent implementations may be substituted for the specific embodiments illustrated and described without departing from the scope of the present invention. This present disclosure covers all methods, apparatus, and articles of manufacture fairly falling within the scope of the appended claims either literally or under the doctrine of equivalents. For example, although the above disclosed example systems include, among other components, software or firmware executed on hardware, it should be noted that such systems are merely illustrative and should not be considered as limiting. This application is intended to cover any adaptations or variations of the embodiments discussed herein. Therefore, it is manifested and intended that the invention be limited only by the claims and the equivalents thereof.

What is claimed is:

1. A command processing pipeline to be coupled to a shared cache, the command processing pipeline comprising:
   a first command processing stage configured to sequentially receive a first cache command and a second cache command, and to sequentially process the first cache command and the second cache command, wherein the first command processing stage is configured to process the second cache command independently of an outcome of processing the first cache command by the first command processing stage;
   a second command processing stage coupled to the first command processing stage such that the first command processing stage and the second command processing stage are two consecutive command processing stages of a plurality of command processing stages of the command processing pipeline, the second command processing stage configured to sequentially receive the first cache command and the second cache command after processing by the first command processing stage, and to process the first cache command substantially simultaneously with the second cache command being processed by the first command processing stage; and
   a third command processing stage coupled to the second command processing stage, the third command processing stage configured to (i) receive the first cache command subsequent to the first cache command being processed by the second command processing stage, and (ii) process the first cache command by writing data associated with the first cache command to one of a valid memory and a dirty memory included in the cache.

2. The command processing pipeline of claim 1, wherein the first command processing stage is configured to process the second cache command before full resolution of the first cache command by the command processing pipeline.

3. The command processing pipeline of claim 1, wherein the first command processing stage is configured to determine whether the first cache command is a hit or a miss, and wherein the command processing pipeline is configured to process the second cache command by the first command processing stage independently of determining whether the first cache command is a hit or a miss.

4. The command processing pipeline of claim 1, wherein the first cache command and the second cache command are received by the first command processing stage during two consecutive clock cycles.

5. The command processing pipeline of claim 1, wherein the first command processing stage is further configured to access a first group of cache resources while processing the first and second cache commands; the second command processing stage is further configured to access a second group of cache resources while processing the first and second cache commands; and the first group of cache resources and the second group of cache resources are different cache resources.

6. The command processing pipeline of claim 1,
   wherein the first command processing stage is further configured to access a first group of cache resources while processing the first and second cache commands, the first group of cache resources comprising one or more of a tag memory, a dirty memory, and a valid memory; and
   wherein the second command processing stage is further configured to access a second group of cache resources while processing the first and second cache commands, the second group of cache resources comprising one or more of a data memory and an error correcting code (ECC) memory.

7. The command processing pipeline of claim 1, further comprising:
   a third command processing stage, a fourth command processing stage, and a fifth command processing stage;
   wherein the third, fourth and fifth command processing stages are configured to sequentially process the first and second cache commands;
   wherein the first, second, third, fourth and fifth command processing stages are five consecutive command processing stages of the command processing pipeline; and
   wherein each of the five consecutive command processing stages accesses only those cache resources that are not being accessed by an adjacent command processing stage.

8. The command processing pipeline of claim 1, wherein the first and second cache commands are received from one or more of a plurality of processors and a plurality of processes that have shared access to the cache.

9. The command processing pipeline of claim 1, wherein the first and second cache commands are two of a read command, a write command, a line fill command, a snoop clean command, a snoop invalidate command, and a snoop clean and invalidate command.

10. The command processing pipeline of claim 1, wherein the first command processing stage is configured to process the first cache command by reading from one or more of a tag memory, the valid memory and the dirty memory included in the cache.

11. The command processing pipeline of claim 1, wherein the first command processing stage is configured to:
   perform an address lookup of the first cache command, by comparing an address associated with the first cache command with information stored in one or more of a tag memory, a dirty memory, and a valid memory included in the cache; and
   determine whether the first cache command is a hit or a miss based at least in part on the address lookup.

12. The command processing pipeline of claim 11, wherein the second command processing stage is configured to:

process the first cache command, based at least in part on the determination of whether the first cache command is a hit or a miss and on a determination of a type of the first cache command, by being configured to perform one or more of
(i) providing a read access to one or both of a data memory and an error correcting code (ECC) memory included in the cache,
(ii) providing a write access to one or both of a data memory and an error correcting code (ECC) memory included in the cache, and
(iii) generating an error correcting code associated with data to be written to the data memory.

13. The command processing pipeline of claim 1, further comprising:
a fourth command processing stage coupled to the third command processing stage, and configured to receive the first cache command after processing by the third command processing stage, and to process the first cache command by performing an error correcting code (ECC) check of data read from one or both of a data memory and an ECC memory of the cache, wherein said data is read from one or both of the data memory and the ECC memory while the first cache command is being processed by the second command processing stage.

14. The command processing pipeline of claim 13, further comprising:
a fifth command processing stage coupled to the fourth command processing stage, and configured to receive the first cache command after processing by the fourth command processing stage, and to process the first cache command by being configured to perform an ECC correction of the read data in case an ECC error is determined while the first cache command is being processed by the fourth command processing stage.

15. A method for accessing a shared cache using a command processing pipeline having a plurality of command processing stages, the method comprising:
processing, by a first command processing stage, a first cache command and a second cache command by accessing a first group of cache resources;
receiving, by a second command processing stage, the first cache command processed by the first command processing stage;
processing, by the second command processing stage, the first cache command substantially simultaneously with said processing of the second cache command by the first command processing stage, wherein processing the first cache command by the second command processing stage comprises accessing a second group of cache resources, wherein the first group of cache resources includes cache resources that are different than cache resources included in the second group of cache resources; and
processing, by a third command processing stage after the first cache command has been processed by the second command processing stage, the first cache command by writing data associated with the first cache command to one or both of a valid memory and a dirty memory included in the cache.

16. The method of claim 15, wherein processing the second cache command by the first command processing stage is performed independently of an outcome of processing the first cache command by the first command processing stage.

17. The method of claim 15, wherein:
processing the first command is performed by the first command processing stage during a first clock cycle,
processing the second cache command is performed by the first command processing stage during a second clock cycle, and
the first clock cycle and the second clock cycle are two consecutive clock cycles of a clock signal.

18. The method of claim 15, further comprising:
processing, by a fourth command processing stage, the first cache command after the first cache command has been processed by the third command processing stage, wherein processing by the fourth command processing stage comprises performing an error correcting code (ECC) check of data read from one or both of a data memory and an ECC memory of the cache, wherein said data is read from one or both of the data memory and the ECC memory while the first cache command is being processed by the second command processing stage; and
processing, by a fifth command processing stage, the first cache command after the first cache command has been processed by the fourth command processing stage, wherein processing by the fifth command processing stage comprises performing an ECC correction of the read data in case an ECC error is determined while the first cache command is being processed by the fourth command processing stage.

19. The method of claim 15, wherein processing the first cache command by the first command processing stage further comprises:
performing an address lookup of the first cache command by comparing an address associated with the first cache command with information stored in one or more of a tag memory, a dirty memory, and a valid memory included in the cache; and
determining whether the first cache command is a hit or a miss based at least in part on the said address lookup.

20. The method of claim 19, wherein processing the first cache command by the second command processing stage further comprises:
processing the first cache command by performing one or more of
(i) providing a read access to one or both of a data memory and an error correcting code (ECC) memory included in the cache,
(ii) providing a write access to one or both of a data memory and an error correcting code (ECC) memory included in the cache, and
(iii) generating an error correcting code associated with data to be written to the data memory;
wherein said providing and generating are based at least in part on (i) a type of the first cache command and (ii) whether the first cache command is a hit or a miss.

* * * * *